United States Patent
Zheng et al.

(10) Patent No.: US 10,914,071 B2
(45) Date of Patent: Feb. 9, 2021

(54) AEROGEL CONTAINING CONSTRUCTION BOARD

(71) Applicant: JOHNS MANVILLE, Denver, CO (US)

(72) Inventors: Guodong Zheng, Highlands Ranch, CO (US); Luke S Weith, Littleton, CO (US); Malay Nandi, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 16/659,039

(22) Filed: Oct. 21, 2019

(65) Prior Publication Data

US 2020/0048905 A1 Feb. 13, 2020

Related U.S. Application Data

(63) Continuation of application No. 15/804,834, filed on Nov. 6, 2017, now Pat. No. 10,480,189.

(51) Int. Cl.
*E04C 2/296* (2006.01)
*B32B 5/16* (2006.01)
(Continued)

(52) U.S. Cl.
CPC .............. *E04C 2/296* (2013.01); *B32B 5/16* (2013.01); *C01B 33/1585* (2013.01);
(Continued)

(58) Field of Classification Search
CPC .............. B32B 5/16; B32B 2260/025; B32B 2262/101; B32B 1/08; B32B 3/26; B32B 5/028; B32B 5/08; B32B 5/18; B32B 15/046; B32B 15/14; B32B 15/20; B32B 27/065; B32B 27/12; B32B 29/007; B32B 29/02; B32B 2255/12; B32B 2260/021; B32B 2262/0253; B32B 2262/0276; B32B 2262/14; B32B 2262/102; B32B 2262/108; B32B 2266/126; B32B 2307/10; B32B 2307/206; B32B 2307/304; B32B 2307/3065; B32B 2307/714; B32B 2307/72; B32B 2307/7265; B32B 2307/73; B32B 2307/732; B32B 2419/00; B32B 2605/08; B32B 2605/12; B32B 2605/16; B32B 2605/18; C01B 33/1585;
(Continued)

(56) References Cited

U.S. PATENT DOCUMENTS

| | | |
|---|---|---|
| 5,040,375 A | 8/1991 | Von Dobeln |
| 5,138,981 A | 8/1992 | Akins |

(Continued)

*Primary Examiner* — James M Ference
(74) *Attorney, Agent, or Firm* — Robert D. Touslee

(57) ABSTRACT

A construction product described herein includes a fiber core that includes a plurality of entangled glass fibers. The fiber core also includes a binder that bonds the plurality of entangled glass fibers together and an Aerogel material that is homogenously or uniformly disposed within the fiber core. In some instances, the fiber core includes between 40 and 80 weight percent of the Aerogel material. The construction product has an R-value of at least 6.5 per inch, a flame spread index of no greater than 5, and a smoke development index of no greater than 20 as measured according to the ASTM E-84 tunnel test.

20 Claims, 6 Drawing Sheets

(51) Int. Cl.

| | |
|---|---|
| C04B 14/06 | (2006.01) |
| E04C 2/20 | (2006.01) |
| E04C 2/16 | (2006.01) |
| E04C 2/30 | (2006.01) |
| E04B 1/88 | (2006.01) |
| C01B 33/158 | (2006.01) |
| C03C 13/00 | (2006.01) |
| C03C 14/00 | (2006.01) |
| E04C 2/22 | (2006.01) |
| C04B 20/00 | (2006.01) |
| C04B 26/32 | (2006.01) |
| C04B 26/06 | (2006.01) |
| E04B 1/90 | (2006.01) |
| E04B 1/74 | (2006.01) |
| C04B 111/52 | (2006.01) |
| C04B 111/28 | (2006.01) |
| C04B 111/56 | (2006.01) |

(52) U.S. Cl.
CPC ............ *C03C 13/00* (2013.01); *C03C 14/002* (2013.01); *C04B 14/064* (2013.01); *C04B 20/0068* (2013.01); *C04B 26/06* (2013.01); *C04B 26/32* (2013.01); *E04B 1/88* (2013.01); *E04B 1/90* (2013.01); *E04C 2/16* (2013.01); *E04C 2/20* (2013.01); *E04C 2/22* (2013.01); *E04C 2/30* (2013.01); *B32B 2260/025* (2013.01); *B32B 2262/101* (2013.01); *B32B 2307/206* (2013.01); *C04B 2111/28* (2013.01); *C04B 2111/52* (2013.01); *C04B 2111/56* (2013.01); *C04B 2201/30* (2013.01); *E04B 2001/742* (2013.01); *E04B 2103/04* (2013.01)

(58) Field of Classification Search
CPC ..... C03C 13/00; C03C 14/002; C04B 14/064; C04B 20/0068; C04B 26/06; C04B 26/32; C04B 2111/28; C04B 2111/52; C04B 2111/56; C04B 2201/30; E04B 1/88; E04B 1/90; E04B 2001/742; E04B 2103/04; E04C 2/16; E04C 2/20; E04C 2/22; E04C 2/296; E04C 2/30; Y02W 30/91

See application file for complete search history.

(56) References Cited

U.S. PATENT DOCUMENTS

| | | | | |
|---|---|---|---|---|
| 5,809,723 A * | 9/1998 | Keith | ............ | E04C 2/288 411/475 |
| 5,996,297 A * | 12/1999 | Keith | ............ | E04C 2/044 411/456 |
| 6,040,375 A * | 3/2000 | Behme | ............ | C04B 26/02 264/15 |
| 6,138,981 A * | 10/2000 | Keith | ............ | E04G 11/18 249/19 |
| 2002/0086907 A1* | 7/2002 | Standke | ............ | C08G 77/18 516/9 |
| 2002/0090316 A1* | 7/2002 | Standke | ............ | C07F 7/0838 422/1 |
| 2005/0100728 A1* | 5/2005 | Ristic-Lehmann | ............ | A41D 19/01529 428/323 |
| 2006/0125158 A1* | 6/2006 | Rouanet | ............ | B32B 5/02 264/621 |
| 2007/0032157 A1* | 2/2007 | McGrath | ............ | C03C 25/323 442/381 |
| 2007/0220904 A1* | 9/2007 | Jibb | ............ | F16L 59/065 62/50.7 |
| 2008/0014435 A1* | 1/2008 | Smith | ............ | F16L 59/065 428/331 |
| 2010/0314195 A1* | 12/2010 | Bliton | ............ | D04H 1/4218 181/290 |
| 2010/0331476 A1* | 12/2010 | Chengyou | ............ | C08G 65/336 524/547 |
| 2011/0047934 A1* | 3/2011 | Brown | ............ | E04B 1/803 53/79 |
| 2011/0114414 A1* | 5/2011 | Bliton | ............ | B32B 5/26 181/286 |
| 2011/0277489 A1* | 11/2011 | Schalla | ............ | A47B 31/02 62/89 |
| 2011/0282024 A1* | 11/2011 | Weissenbach | ............ | C08G 77/14 528/12 |
| 2012/0009376 A1* | 1/2012 | Rusek, Jr. | ............ | B32B 15/18 428/69 |
| 2012/0037838 A1* | 2/2012 | Bauer | ............ | B01J 13/0091 252/62 |
| 2012/0097907 A1* | 4/2012 | Bauer | ............ | C04B 14/064 252/602 |
| 2012/0238174 A1* | 9/2012 | Bullock | ............ | B32B 5/245 442/374 |
| 2013/0171900 A1* | 7/2013 | Bauer | ............ | B32B 5/02 442/181 |
| 2013/0196137 A1* | 8/2013 | Evans | ............ | B32B 5/26 428/292.1 |
| 2013/0216907 A1* | 8/2013 | Rayner | ............ | B22F 9/04 429/211 |
| 2013/0295303 A1* | 11/2013 | Parks | ............ | F16L 59/026 428/34.5 |
| 2014/0128488 A1* | 5/2014 | Lotti | ............ | C08J 9/0066 521/76 |
| 2014/0255642 A1* | 9/2014 | White | ............ | C08G 73/10 428/71 |
| 2014/0273701 A1* | 9/2014 | Samanta | ............ | E04B 1/78 442/334 |
| 2014/0287641 A1* | 9/2014 | Steiner, III | ............ | B32B 5/26 442/223 |
| 2014/0318069 A1* | 10/2014 | Moennig | ............ | E04B 1/762 52/511 |
| 2014/0335305 A1* | 11/2014 | Syryda | ............ | F16L 59/029 428/100 |
| 2014/0367033 A1* | 12/2014 | Smith | ............ | E04B 1/803 156/212 |
| 2015/0165736 A1* | 6/2015 | Sattayatam | ............ | B32B 3/12 428/117 |
| 2015/0260329 A1* | 9/2015 | Bond | ............ | F16L 59/029 428/35.2 |
| 2015/0362119 A1* | 12/2015 | Parks | ............ | B32B 5/022 138/149 |
| 2016/0046495 A1* | 2/2016 | Xiang | ............ | C01B 33/14 428/69 |
| 2016/0061375 A1* | 3/2016 | Parks | ............ | F16L 59/029 442/327 |
| 2016/0137836 A1* | 5/2016 | Wakita | ............ | C08F 283/12 525/451 |
| 2016/0185068 A1* | 6/2016 | Shinohara | ............ | F16L 59/026 156/60 |
| 2016/0200070 A1* | 7/2016 | Lee | ............ | B32B 3/26 428/113 |
| 2016/0340064 A1* | 11/2016 | Loda | ............ | B65B 1/16 |
| 2017/0204604 A1* | 7/2017 | Frank | ............ | E04B 1/8209 |
| 2017/0227165 A1* | 8/2017 | Ray | ............ | F17C 3/08 |
| 2019/0136527 A1* | 5/2019 | Zheng | ............ | E04B 1/90 |
| 2019/0169842 A1* | 6/2019 | Zheng | ............ | B32B 5/18 |

* cited by examiner

A-A

AEROGEL CONTAINING CONSTRUCTION BOARD

CROSS REFERENCE TO RELATED APPLICATIONS

This application is a continuation of pending U.S. application Ser. No. 15/804,834, filed Nov. 6, 2017.

BACKGROUND

Fiberglass based construction or composite boards are often used to insulate commercial and residential structures. The fiberglass based construction or composite boards often include entangled glass fibers that are adhered together with a binder, such as a thermosetting binder. A facer may be positioned on one or more sides of the construction or composite board for aesthetic or other purposes, such as providing a vapor barrier, increasing fire performance, and the like. The fiberglass based construction or composite boards are often flexible, semi-rigid, or rigid boards that vary in density. The fiberglass based construction or composite boards are commonly made from inorganic glass fibers and exhibit good thermal, fire, and acoustical properties.

BRIEF SUMMARY

The embodiments described herein relate to composite or construction boards that include an insulative material disposed within the interior of the construction board. The construction board is typically a fiberglass based board in which the insulative material is dispersed throughout the fiberglass material. The construction board is typically made of an inorganic material and exhibits exceptional fire resistance. The construction board typically is composed of Aerogel particles (i.e., the insulative material), microfibers, a silicone binder, and carbon black, although other construction board compositions are also possible.

According to a first aspect, a glass fiber based construction product having improved insulative is provided. The glass fiber based construction product includes a glass fiber core comprising and a mixture of Aerogel and carbon black homogenously disposed within the glass fiber core. The fiber core includes a plurality of entangled coarse glass fibers, a plurality of entangled glass microfibers homogenously dispersed within the entangled coarse glass fibers, and a binder that bonds the plurality of coarse glass fibers and the plurality of glass microfibers together. The coarse glass fibers have average fiber diameters of between 8 and 20 µm and the glass microfibers have average fiber diameters of between 0.5 and 6 µm. The fiber core includes between 5 and 20 weight percentage of the binder. The mixture of Aerogel and carbon black includes between 85 and 95 weight percent of the Aerogel and between 5 and 15 weight percent of the carbon black. The glass fiber based construction product has an R-value of at least 6.5 per inch, a flame spread index no greater than 5, and a smoke development index no greater than 20 as measured according to ASTM E84.

In some embodiments, the glass fiber core includes between 1 and 15 weight percent of the coarse glass fibers and between 10 and 40 weight percent of the glass microfibers. The glass fiber core may also include between 0.5 and 2 weight percent of a hydrophobic agent. The glass fiber core may further include at least 50 weight percent of the Aerogel, and more commonly between 50 and 80 weight percent of the mixture of Aerogel and carbon black. The glass fiber based construction product may have an R-value of at least 7.0 per inch. Common insulation applications for the glass fiber based construction product include the following: residential structures, commercial structures, oil or gas refineries, crude oil pipelines, liquefied natural gas plant/transportation, chemical plants, automotive structures, aerospace/aircraft structures, and the like. In some embodiments, the glass fiber core has a non-rectangular shape, such as a pipe or cylindrical shape.

According to another aspect, a construction product is provided. The construction product includes a fiber core and an Aerogel material homogenously or uniformly disposed within the fiber core. The fiber core includes a plurality of entangled glass fibers and a binder that bonds the plurality of entangled glass fibers together. The fiber core also includes between 40 and 80 weight percent of the Aerogel, and more commonly at least 50 weight percent of the Aerogel. The construction product has an R-value of at least 6.5/inch, a flame spread index no greater than 5, and a smoke development index no greater than 20 as measured according to ASTM E-84 tunnel test. The construction product may have an R-value of at least 7.0 per inch.

In some embodiments, carbon black is homogenously or uniformly disposed within the fiber core. In such embodiments, the glass fiber core may include between 30 and 90 weight percent of a mixture of the Aerogel and carbon black. The plurality of entangled glass fibers may include a plurality of entangled coarse glass fibers and a plurality of entangled glass microfibers homogenously dispersed within the entangled coarse glass fibers. The coarse glass fibers may have average fiber diameters of between 8 and 20 µm and the glass microfibers may have average fiber diameters of between 0.5 and 6 µm. In such embodiments, the fiber core may include between 1 and 15 weight percent of the coarse glass fibers and between 10 and 40 weight percent of the glass microfibers. In some embodiments, the construction product has a non-rectangular shape, such as a pipe or cylindrical shape.

According to another aspect, a method of forming a construction product having improved insulative properties is provided. The method includes providing an aqueous solution that includes glass fibers and an Aerogel material homogenously or uniformly dispersed within the glass fibers and pouring the aqueous solution onto a porous surface. The method also includes removing water from the aqueous solution to form a wet laid material mixture or mat of the glass fibers and Aerogel material atop the porous surface and applying a binder to the wet laid mat/material mixture. The method further includes curing the binder to bond the glass fibers and Aerogel material together and thereby form a fiber core of the construction product. The fiber core includes between 40 and 80 weight percent of the Aerogel. The fiber core also has an R-value of at least 6.5/inch, a flame spread index of no greater than 5, and a smoke development index of no greater than 20 as measured according to ASTM E-84 test.

In some embodiments, the method may additionally include applying pressure to the wet laid mat/material mixture during the curing process. The aqueous solution may also include carbon black that is homogenously or uniformly dispersed within the glass fibers and the Aerogel material. In such embodiments, the fiber core may include between 40 and 90 weight percent of the Aerogel material and carbon black. The glass fibers of the aqueous solution may include coarse glass fibers and glass microfibers homogenously dispersed within the coarse glass fibers. The coarse glass fibers may have average fiber diameters of between 8 and 20

µm and the glass microfibers may have average fiber diameters of between 0.5 and 6 µm. In such embodiments, the fiber core may include between 1 and 15 weight percent of the coarse glass fibers and between 10 and 40 weight percent of the glass microfibers.

In some embodiments, the method additionally includes transferring the wet laid mat/material mixture to a mold and curing the binder within the mold such that the fiber core of the construction product has a non-rectangular shape. In such embodiments, the wet laid mat/material mixture is often in a powder or particle form, which aids in transferring the wet laid mat/material mixture to the mold. The wet laid mat may be cured in the mold at a temperature of between 150 and 200 Celsius. The wet laid mat may be cured in the mold for between 2 and 4 hours. The mold may be pipe or cylindrical shaped such that the fiber core of the construction product is pipe or cylindrical shaped.

BRIEF DESCRIPTION OF THE DRAWINGS

The present invention is described in conjunction with the appended figures.

Figure 1:
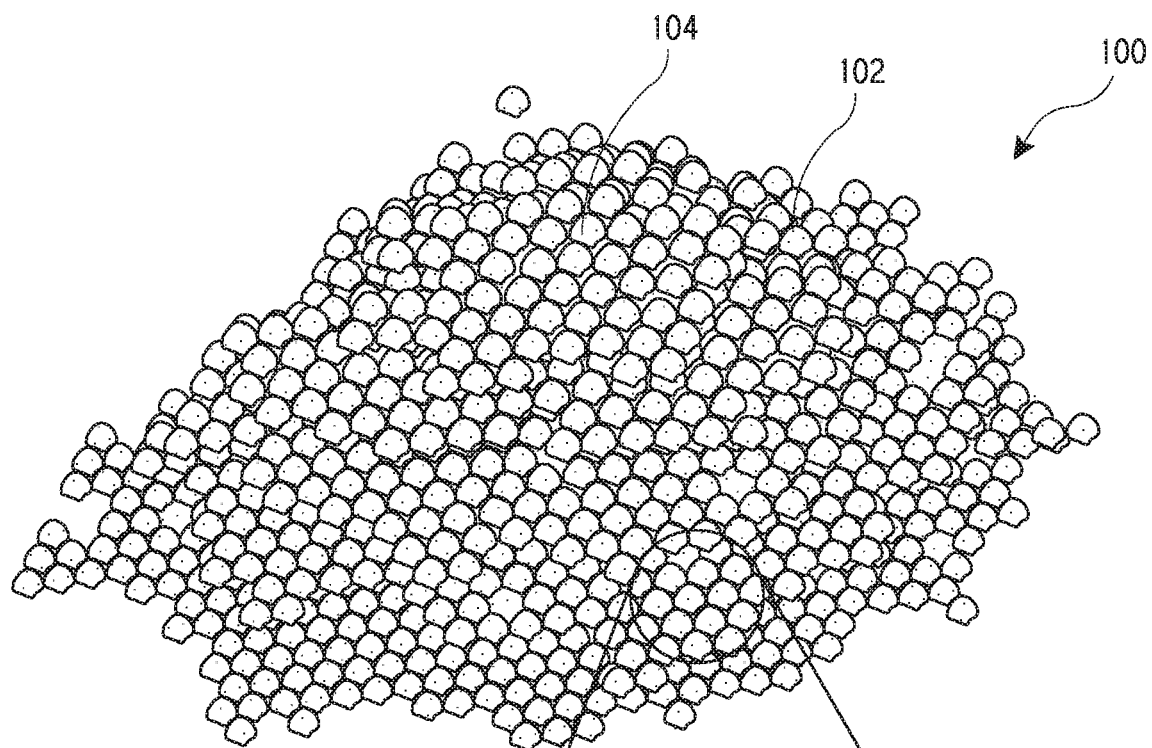
FIG. 1 illustrates an aggregation, mass, or collection of insulative particles, and in particular Aerogel particles.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

"ASTM" refers to American Society for Testing and Materials and is used to identify a test method by number. The year of the test method is either identified by suffix following the test number or is the most recent test method prior to the priority date of this document.

The embodiments described herein are related to composite or construction boards that include an Aerogel material disposed within the interior of the construction board. The construction board is typically a fiberglass based board in which the Aerogel is dispersed throughout the fiberglass material. The construction board is typically made of an inorganic material and exhibits exceptional fire resistance. The construction board typically is composed of Aerogel particles, microfiber, a silicone binder, and carbon black, although other construction board compositions are also possible. The construction board has high thermal insulation value, good fire resistance, high thermal stability, and good acoustic properties. The construction board can be made through a wet laid process and the density of the construction board can also be adjusted.

Aerogel is a synthetic highly porous and ultralight weight material which is usually made through a sol-gel process. Aerogel is an excellent thermal insulator due to its light weight (i.e., typically 98% air) and extremely small pore size (typically 10-40 nm). Aerogels, such as silica aerogel, by themselves are hydrophilic but can be made hydrophobic by chemical treatment. The extremely small pore size of the Aerogel greatly enhances the thermal insulation R-value of the resulting construction board, which often exceeds and R-value of 6.0, 6.5, or 7.0 for the construction board. The highly porous Aerogel material greatly minimizes heat or thermal energy transfer due to conduction. The decreased conduction is due to the Aerogel material being mainly composed of a gas or air (i.e., typically 98% air), which minimizes thermal conduction within or through the particle due to the small solid mass and tortuous path.

The Aerogel material that is employed in the construction boards can also greatly minimize thermal energy transfer due to radiation, which is not an important mode of heat transfer at low temperature, but becomes the dominant mode of heat transfer at high temperatures. For example, a black material may be mixed with the Aerogel, which may function as a radiation absorber in order to reduce or suppress radiation heat transfer. In a specific embodiment, carbon black granules may be mixed with the Aerogel. The black material functions as a blackbody radiator, which greatly minimizes heat or thermal energy transfer due to radiation. The black material may be mixed with the Aerogel so that the mixtures comprises or consists of approximately 1-10 weight percent of the black material and 90-99 weight percent of the Aerogel. In other embodiments, the mixture may comprise or consists of 2-8 weight percent of the black material and 92-98 weight percent Aerogel, or 3-6 weight percent of the black material and 94-97 weight percent of the Aerogel.

The Aerogel material may also minimize heat or thermal energy transfer due to convention since the Aerogel material is resistant to convective heat or thermal energy transfer and since the Aerogel material occupies a significant volume within the construction board. The resistant of the Aerogel material to convective heat or thermal energy transfer is due mainly to the extremely small hollow pores in which air or gas is contained, which reduces the effectiveness of gas conduction. Specifically, the pore size of the Aerogel may be smaller than the mean free path of air at ambient temperature and pressures, which is around 50-60 nanometers. The extremely small pore size results in the convective heat or thermal energy transfer being very insignificant and/or negligible.

Since the Aerogel material employed in the construction board has significant insulative properties as described above, the use of this material in the construction board greatly increases the insulative properties of the construction board. For example, the heat or thermal energy transfer through the construction board is mainly due to the other components that are used in forming the construction board and not due to the Aerogel material. Specifically, the heat or thermal energy is transferred through the construction board (via conduction, convention, and/or radiation) due to the fibers, the binder, the filler materials, and/or any other components. The composition and/or arrangement of these materials can be engineered within the construction board and/or in relation to the Aerogel material to achieve thermal insulative R-values that are not achievable with conventional construction boards.

The construction board products described herein have a variety of insulative applications. For example, the construction boards may be used to insulate residential or commercial building or structures. In other instance, the construction boards may be used to insulate various industrial building, structures, or components. For example, the construction board products may be used to insulate sections of piping that transport hot substances, such as various fluids in oil refineries. In such instances, the construction board products may include one or more cut sections that allow the construction board products to be rolled around the pipe. In other instances, the construction board products may be used to insulate chemical factories in which hot gases are reacted together. The construction board products may be ideal for insulating such industrial processes due to the excellent fire resistant properties of the construction board products. The construction board may likewise be employed to insulate various other structures, such as Aerospace structures and/or Navy ships/submarines. Having referred generally to the construction boards and Aerogel material, additional details and aspects of the boards and Aerogel material will be realized in relation to the description of the embodiments and drawings provided below.

Aerogel Material

Referring now to FIG. 1, illustrated is an aggregation, mass, or collection 100 of Aerogel particles 102. As described above, the Aerogel particles 102 are synthetic highly porous and ultralight weight materials. The Aerogel particles 102 are typically made through a sol-gel process, although any other process of forming the Aerogel particles 102 known in the art may be employed. The Aerogel particles 102 are excellent thermal insulators due to being extremely light weight and low density (i.e., 98% air) and having extremely small pore sizes, which typically are between 10 and 40 nanometers. The nano-sized pores of the Aerogel particles 102 enable the Aerogel particles 102 to exhibit low thermal conductivity by essentially eliminating convection and gas conduction heat or thermal energy transfer. The Aerogel particles 102 are preferably silica Aerogel particles 102, but may also include various other materials, such as organic aerogels, polyimide aerogel, polyurethane aerogel, and the like.

Figure 1A:
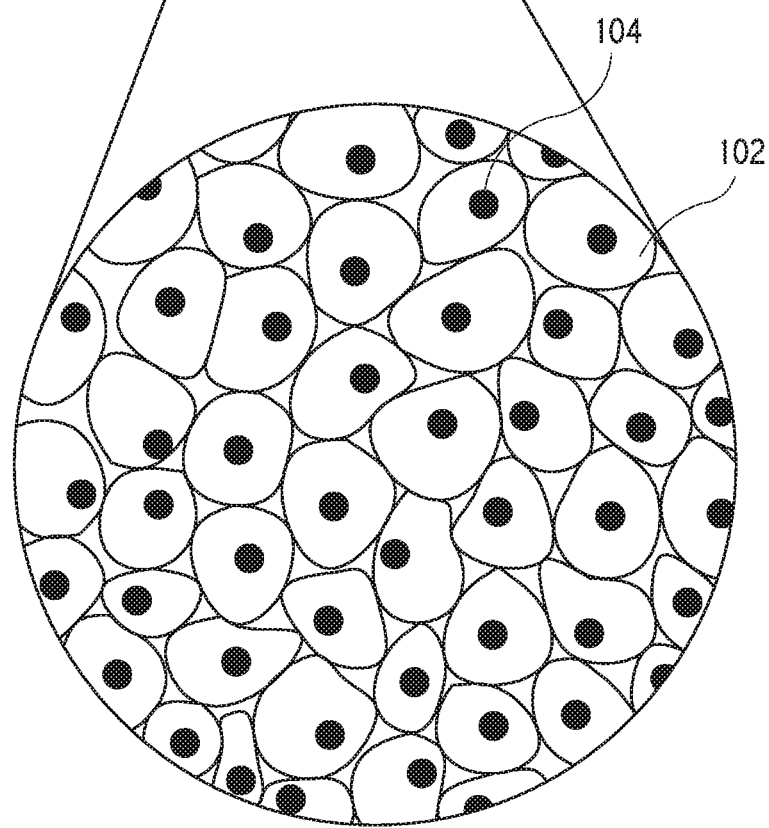
FIG. 1A illustrates an expanded view of the aggregation, mass, or collection of insulative particles and further illustrates the individual insulative particles in greater detail.

FIG. 1A illustrates an expanded view of a portion of the Aerogel material aggregation, mass, or collection 100 and illustrates the individual Aerogel particles 102 in greater detail. As illustrated, the Aerogel particles 102 may be solid blocks or particles, which typically have a particle size or diameter of between 25 and 500 microns, although a particle size of between 50 and 500 microns is more common and a particle size of between 100 to 200 microns is most common. Various other particle sizes for the Aerogel particles may likewise be employed. A particle size of between 100-200 microns may enable the Aerogel particles to be easily dispersed within a white water solution and allow the water to be easily drained during the formation of a construction board. The Aerogel particles 102 are typically also hydrophobic, which enables the Aerogel particles 102 to be directly added to water in the construction board formation process without the water, or other materials in the water, plugging the pores of the Aerogel particles 102. If the pores of the Aerogel particles are plugged, the desired insulative properties may be negated or eliminated.

FIGS. 1 and 1A also illustrate that in some embodiments, the aggregation, mass, or collection 100 includes a blackbody material 104, which is homogenously or uniformly dispersed within and throughout the Aerogel particles 102. The term "blackbody material" means that the material is a good thermal insulator in regards to radiation and may exhibit characteristics similar to theoretical blackbody radiators. The blackbody material 104 may be added to the Aerogel particles 102 to provide a radiant barrier by impeding and minimizing heat transfer due to thermal radiation.

An exemplary material that may be used as the blackbody material 104 is carbon black. Other materials that may be employed as the blackbody material 104 include iron oxide, titanium dioxide, and the like. Iron oxide may be the preferred blackbody material 104 when high operating temperature are anticipated, such as a temperature higher than 400 Celsius. The carbon black that is typically used is an aqueous dispersion of carbon black.

In some embodiment, the aggregation, mass, or collection 100 may only include Aerogel particles 102. In other embodiments, the aggregation, mass, or collection 100 may include a combination of Aerogel particles 102 and the blackbody material 104. In yet other embodiments, the aggregation, mass, or collection 100 may include other filler materials that are mixed with the Aerogel particles 102 in isolation, or that are mixed with the Aerogel particles 102 and the blackbody material 104. When the aggregation, mass, or collection 100 includes a combination of the Aerogel particles 102 and the blackbody material 104, the aggregation, mass, or collection 100 may include between 85 and 95 weight percent of the Aerogel particles 102 and between 5 and 15 weight percent of the blackbody material 104. In other embodiments, the aggregation, mass, or collection 100 may include between 90 and 99 weight percent of the Aerogel particles 102 and between 1 and 10 weight percent of the blackbody material 104 or between 92 and 98 weight percent of the Aerogel particles 102 and between 2 and 8 weight percent of the blackbody material 104. In a specific embodiment, the aggregation, mass, or collection 100 may include between 94 and 97 weight percent of the Aerogel particles 102 and between 3 and 6 weight percent of the blackbody material 104.

Although the aggregation, mass, or collection 100 is described as including Aerogel particles 102, in other embodiments the Aerogel particles 102 may be replaced, or used in combination with, other materials that exhibit excellent thermal insulative properties. These other materials may include hydrophobic silica that is fumed and precipitated, titanium oxide materials, and the like. For ease in describing the embodiments herein, the description will focus on the construction boards and/or the aggregation, mass, or collection 100 including Aerogel particles 102. It should be realized, however, that the term "Aerogel particles 102" as used in the description and/or claims may be substituted with a "hydrophobic silica that is fumed and precipitated" and/or with "titanium oxide materials" or other similar materials without departing from the spirit and intent of the invention. For example, the ratios of the Aerogel particles 102 and blackbody materials 104 in the construction boards and aggregation, mass, or collection 100 represent ratios that may be used for the other insulative materials—i.e., hydrophobic silica that is fumed and precipitated, titanium oxide materials, and the like. In addition, it should be realized that these other materials (e.g., hydrophobic silica that is fumed and precipitated, titanium oxide materials, and the like) may be used in combination with the Aerogel particles 102 and/or blackbody material 104 as desired.

Fiberglass Construction Board

Figure 2:
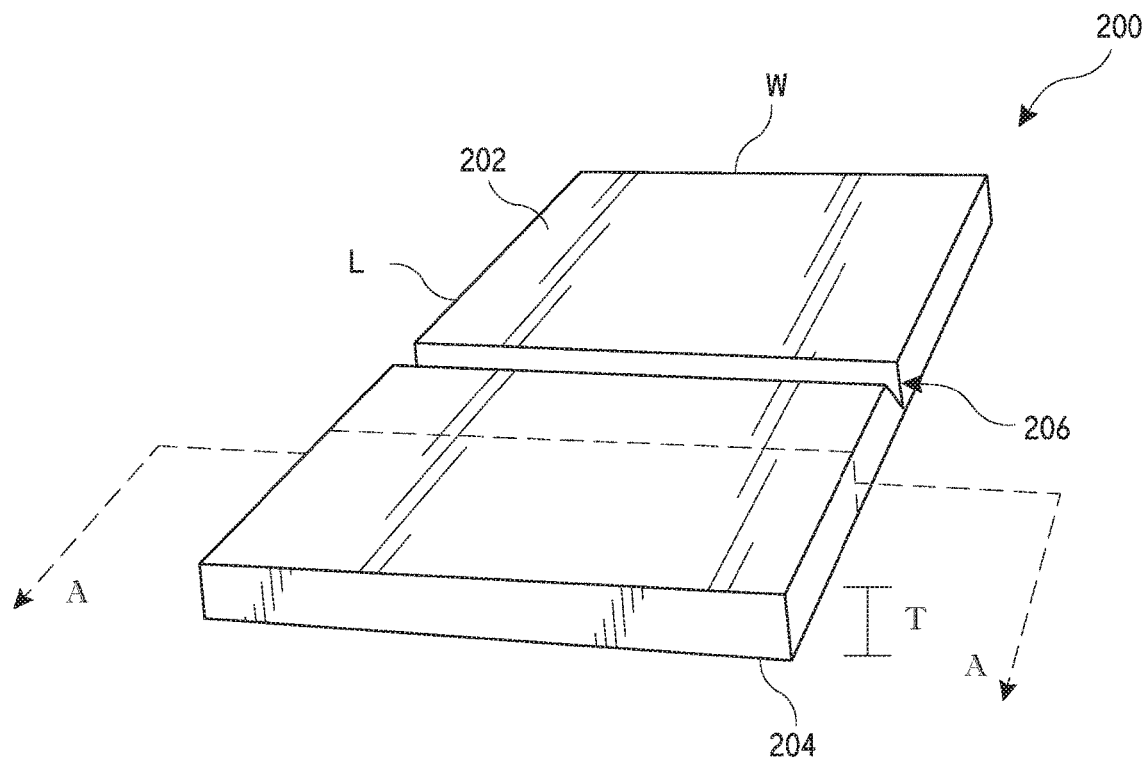
FIG. 2 illustrates a construction product or board that includes the insulative particles of FIG. 1.

Referring to FIG. 2, illustrated is a construction product or board 200 that includes the Aerogel particles 102. The construction board 200 exhibits improved insulative properties in comparison with conventional construction boards. In some embodiments, the construction board 200 is a glass fiber based construction board or product. The construction board 200 is typically a rectangular board having a length L, a width W, and a thickness T, which may be selected based on the application in which the construction board 200 will be used. Common values for the length L include 4-10 feet, whereas common values for the width W include 2-6 feet, and common values for the thickness T include 1-4 inches. The construction board 200 may likewise have a material density or weight of between 3 and 12 lb/ft$^3$, or between 4 and 10 lb/ft$^3$, or between 6 and 8 lb/ft$^3$.

The construction board 200 has a first face 202 and a second face 204 that is positioned opposite the first face 202. In some embodiments, the first face 202 and/or second face 204 include facer materials that may be employed to provide an aesthetic appearance or that may be employed to provide an additional property, such as a desired smoothness, texture, and the like. In other embodiments, the first face 202 and/or the second face 204 may be free of a facer material, or may include a material coating as desired. The construction board 200 may be used for a variety of insulative applications including insulating residential or commercial buildings, structures, or components; insulating oil or gas refineries components and/or structures; insulating chemical plant components and/or structures; insulating an automotive component and/or structure; insulating an aerospace component and/or structure; and the like. The construction board 200 may be ideal for insulating industrial components and/or structures due to the construction board 200 having excellent fire resistant properties. For example, the construction board 200 may be used to insulate chemical factories in which hot gases are reacted together.

In other embodiments, the construction board 200 may not have a rectangular shape, but instead may be configured to be rolled or positioned about a circular object, such as a pipe. For example, the construction board 200 may include one or more cut sections as shown by the dashed line 206 in FIG. 2. The cut sections represent where the material would be removed, which would allow the construction board 200 to be rolled and positioned around a pipe. In such instances, the construction board 200 may be used to insulation sections of piping that transport hot substances, such as various fluids in oil refineries. In other embodiments, the construction board 200 may not be a board, but rather may be a product that is shaped and configured to insulation various other shapes or even irregular shaped objects. For example, the construction product may be used as pipe insulation or may be a molded irregular sharp insulation product. Thus, the embodiments described and contemplated here are not limited to any particular geometric shape or design.

Figure 3:
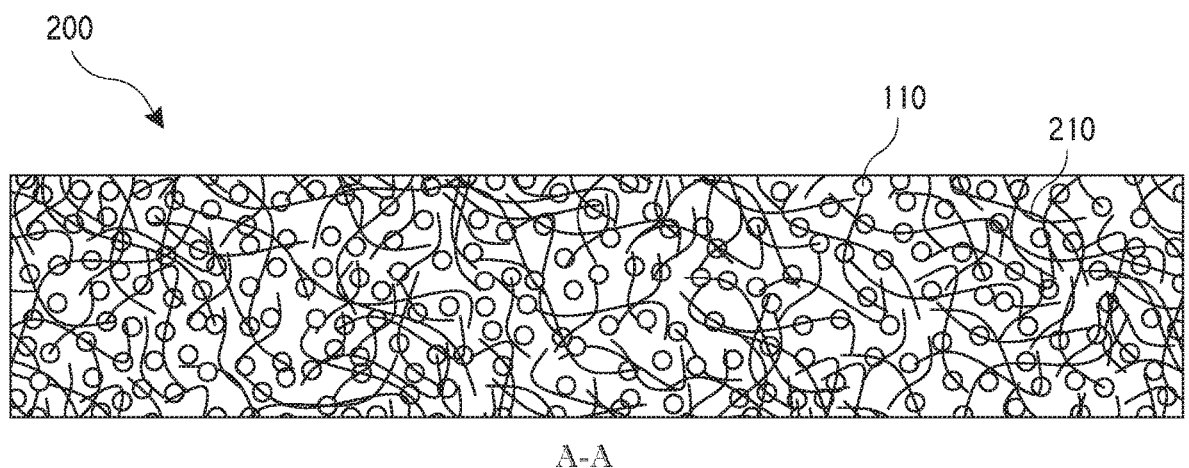
FIG. 3 illustrates a cross-section view of the construction board of FIG. 2.

FIG. 3 illustrates a cross-section of the construction board 200 taken along line A-A. As illustrated, the construction board 200 includes a fiber core that includes a plurality of entangled fibers 210. The entangle fibers 210 may include glass fibers, polymeric fibers (e.g., polyester fiber and/or polypropylene fiber), and the like. In an exemplary embodiment, the entangled fibers 210 consist of, or consist essentially of, glass fibers and more commonly a combination of entangled coarse glass fibers and glass microfibers. The term coarse fibers refers to fibers having average fiber diameters greater than 6 microns while the term microfibers refers to fibers having average fiber diameters of less than 6 microns. The term entangled fibers refers to fibers that are randomly oriented within the fiber core, which is in contrast to fibers that are woven or otherwise constructed to have a specific orientation. The random orientation of the entangled fibers is typically achieved by forming the fiber core via a wet-laid process.

In a specific embodiment, the entangled fibers 210 of the fiber core include a plurality of entangled coarse glass fibers having average fiber diameters of between 8 and 20 μm and a plurality of entangled glass microfibers having average fiber diameters of between 0.5 and 6 μm. In other embodiments, the coarse glass fibers may have an average fiber diameter of between 10 and 16 μm and the glass microfibers may have an average fiber diameter of between 1 and 3 μm. The glass microfibers are typically homogenously or uniformly dispersed within the entangled coarse glass fibers so that the coarse glass fibers and the glass microfibers are entirely dispersed throughout the cross sectional area and volume of the construction board 200 without taking into account any facers, coatings, or other components that may be positioned on the first face 202 and/or the second face 204.

In one embodiment, the construction board 200 may include between 1 and 15 weight percent of the coarse glass fibers and between 10 and 40 weight percent of the glass microfibers. In another embodiment, the construction board 200 may include between 3 and 10 weight percent of the coarse glass fibers and between 15 and 35 weight percent of the glass microfibers. In yet another embodiment, the construction board 200 may include between 5 and 8 weight percent of the coarse glass fibers and between 20 and 30 weight percent of the glass microfibers.

The construction board 200 is typically an entirely inorganic system, which enables the construction board 200 to be used in very high temperature conditions since there is no danger of fire. As briefly describe above, in some embodiments the construction board 200 includes fibers other than glass fibers. In such embodiments, the reference numeral 210 refers to those other fibers, which may include a combination of entangled coarse fibers and microfibers in the various size ranges and combinations described. In other embodiments, the construction board 200 may include a combination of non-glass fibers and glass fibers. For example, the construction board 200 may include non-glass coarse fibers and glass microfibers, or vice versa. The various size ranges and combinations described herein may be used for the combined non-glass fibers and glass fibers.

The construction board 200 typically includes a binder that bonds the entangled fibers 210 together. Specifically, the binder bonds or adheres the plurality of coarse fibers and the plurality of microfibers together. The construction board 200 may include between 5 and 20 weight percent of the binder. In other embodiments, the construction board 200 may include between 8 and 18 weight percent of the binder or between 10 and 16 weight percent of the binder. In some embodiments, the binder is a siloxane based emulsion that is able to crosslink at high temperatures (e.g., over 200 Celsius). The siloxane based emulsion binder exhibits exceptional water resistance and has a high working temperature (e.g., over 200 Celsius). The siloxane based emulsion binder also does not produce toxic gas when burned. Other binders may be employed, such as acrylic binders or other polymer binders, although such binders may not be as effective in terms of water resistance and/or working temperature.

FIG. 3 further illustrates that the fiber core includes an insulative material or mixture 110 that is homogenously or uniformly disposed and/or dispersed within the fiber core. The insulative material 110 typically includes Aerogel particles 102 and thus, the insulative material 110 may also be referred to as an Aerogel material or mixture 110. The Aerogel particles 102 may be friable and easily shattered and as such, the Aerogel particles 102 may be embedded within the matrix of the construction board 200, which greatly improves the durability of the Aerogel particles 102 and prevents the particles from being shattered. In some embodiments, the Aerogel material/mixture 110 may only include Aerogel particles 102, while in other embodiments the Aerogel material/mixture 110 may include the blackbody material 104 and/or other materials as previously described. Thus, the reference number 110 is used refer to any combination of the materials described above including: Aerogel particles 102 only, a combination of Aerogel particles 102 and the blackbody material 104, hydrophobic silica that is fumed and precipitated, titanium oxide materials, or a combination of any of these materials.

The fiber core may include between 30 and 90 weight percent of the Aerogel material/mixture 110, and more commonly between 40 and 80 weight percent of the Aerogel material/mixture 110. The Aerogel material/mixture 110 is homogenously or uniformly disposed and/or dispersed within the fiber core so that the Aerogel material/mixture 110 is entirely dispersed throughout the cross sectional area and volume of the construction board 200 without taking into account any facers, coatings, or other components that may be positioned on the first face 202 and/or the second face 204.

In one embodiment, the Aerogel material/mixture 110 includes only Aerogel particles 102. In such embodiments, the fiber core of the construction board 200 may include at least 50 weight percent of the Aerogel, and more commonly between 50 and 80 weight percent of the Aerogel. In another embodiment, the Aerogel material/mixture 110 may include a mixture of the Aerogel particles 102 and carbon black that is homogenously or uniformly mixed or dispersed. In such embodiments, the fiber core of the construction board 200 may include at least 30 weight percent of the Aerogel particles 102 and more commonly at least 50 weight percent of the Aerogel particles 102. In some embodiments, the fiber core of the construction board 200 may include between 30 and 80 weight percent of the Aerogel/carbon black mixture and more commonly between 50 and 80 weight percent of the Aerogel/carbon black mixture. The Aerogel/carbon black mixture may include between 85 and 95 weight percent of the Aerogel particles 102 and between 5 and 15 weight percent of the carbon black.

The construction board 200 typically includes the microfibers, and more commonly a high percentage of microfibers, in order to constrain the Aerogel particles 102 and carbon black within the fiber core matrix. The range of the microfibers that are employed may be modified, but the microfibers are typical not eliminated from the fiber core in order to prevent the aerogel particles 102 and/or carbon black from falling out. In some embodiments, the construction board 200 includes at least 10-40 weight percent of microfibers, which is sufficient to maintain the Aerogel particles 102 and carbon black within the fiber core matrix.

In some embodiments, the fiber core of the construction board 200 includes between 0.5 and 2 weight percent of a hydrophobic agent. The hydrophobic agent may prevent water condensation and/or corrosion in the construction board. The hydrophobic agent may also be employed as process aid during formation of the construction board 200 to enable quick removal of the water. An example of a hydrophobic agent that may be employed in forming the construction board 200 is a methyl hydrogen silicone marcroemulsion, such as those sold by Dow Corning corporation. The silicone emulsion crosslinks and forms a hydrophobic layer on glass surface.

As provided above, the construction board 200 has a high thermal insulation value, good fire resistance, high thermal stability, and good acoustic properties. For example, the use of the Aerogel particles 102 and/or blackbody material 104 may enable the construction board 200 to have an increase in R-value of greater than 2.0 in comparison with conventional fiberglass construction boards. Specifically, the construction board 200 typically exhibits an R-value of at least 6.5 per inch, and often exhibits an R-value of at least 7.0 per inch. The construction boards described in the examples have material compositions as described herein and exhibit R-values of 6.5 or 7.0 per inch or greater. These R-values are significantly greater than conventional fiberglass based construction boards, which often have R-values of less than 4.5 per inch. In addition to the exceptional R-values, the construction board 200 also typically exhibits a flame spread index no greater than 5 and a smoke development index no greater than 20 as measured according to ASTM E-84-17 test or tunnel test. The construction boards described in the examples exhibit flame spread indexes and smoke development indexes as described.

Exemplary Method

The incorporation of Aerogel particles into the construction boards fiber core can be achieved through a wet laid process. In this process, fibers (e.g., glass fibers) are first dispersed in an aqueous medium, which is commonly called a white water solution. The fibers are then collected on a porous belt to form a mixture of the materials, which is often in the form of a web of the fibers, while the water is drained off and recycled back into a dispersion tank. The collected fibers may be referred to hereinafter as a material mixture or a fiber web. A binder, which adheres the fibers together, is applied to the wet fiber web or material mixture, such as through a curtain coater, and the binder coated wet fiber web or material mixture is dried in a continuous oven. In some embodiments, a separate slurry can be made with dispersed Aerogel particles and the slurry can be added to the white water solution or combined with the fibers during or shortly after the formation of the wet fiber web or material mixture. The wet fiber web or material mixture and Aerogel can be coated with binder and dried in the same continuous oven. In some embodiments, a small amount of glass microfibers can be added to the Aerogel particle slurry to better embed the Aerogel particles within the fiber core.

Another process of forming the construction board's fiber core involves combining all ingredients in an aqueous solution (i.e., making a slurry) so that all the ingredients are homogenously or uniformly dispersed within the aqueous solution. The ingredients that are combined in the aqueous solution include any of the components described herein, such as fibers (e.g., coarse glass fibers and/or glass microfibers), Aerogel particles, blackbody material, hydrophobic silica, titanium oxide, etc. The slurry is then wet laid on a screen (e.g., hydroformer) to drain out the water and form a wet fiber web or material mixture. The draining process can be accelerated by either a press or vacuum as desired and a binder is then added to the wet fiber web or material mixture via a curtain coater or other mechanism. The wet fiber web or material mixture may be pressed and/or vacuumed to achieved a controlled or desired thickness. The wet fiber web or material mixture produced after draining is transferred to a hot press to further remove the excess water and cure the binder. Alternatively, the wet fiber web may be cut to a specific length and/or clamped in a thickness retaining device. The clamped and/or cut wet fiber web may be transferred to a an oven for dying process, after which the dried board would be unclamped.

The Aerogel particles that are added to the aqueous solution are highly hydrophobic, which enables the Aerogel to be directly added to water without the water or other materials in the aqueous solution plugging the pores of the Aerogel particles. The carbon black that is used in the aqueous solution is typically an aqueous dispersion of carbon black, which enables the carbon black particles to be easily dispersed within the slurry.

Figure 7:
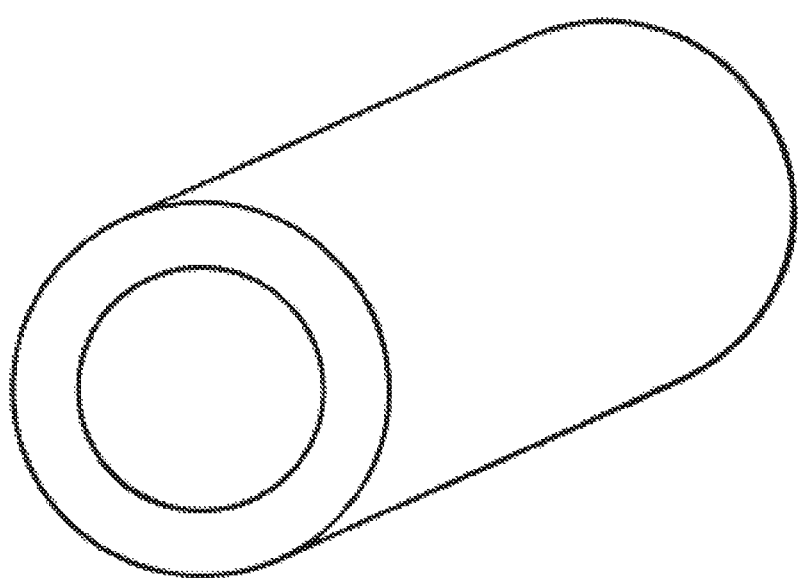
FIG. 7 illustrates a perspective view of a non-rectangular shaped insulation product, and in particular pipe or cylindrical shaped insulation product.

In some embodiments, the material mixture may be transferred to a mold to form an object having a shape other than a rectangular board. In such embodiments, the material mixture is typically in a particle or powder state, which enables the material mixture to be easily transferred to the mold. For example, the material mixture may be transferred to a pipe or cylindrical shaped mold to form a pipe or cylindrical shaped insulation product. Different shaped molds may likewise be employed to form different shaped insulation products. FIG. 7 illustrates a non-rectangular shaped insulation product, and more specifically illustrates an insulation product that has a pipe or rectangular shape. The material mixture may be dried in the mold to form the insulation product and then subsequently removed from the mold. In some instances, a film, facer, or other exterior material may be adhered or bonded with the insulation product either during the curing process or subsequent thereto. In a particular embodiment the film or facer may comprise or consist of a plastic film, a coated paper, an aluminum film laminated facer, and the like. In a specific embodiment a water impermeable film or facer may be positioned on a pipe or cylindrical shaped insulation product. In such embodiments, the pipe or cylindrical shaped insulation product may have an R-value of at least 7.0 per inch.

Figure 4:
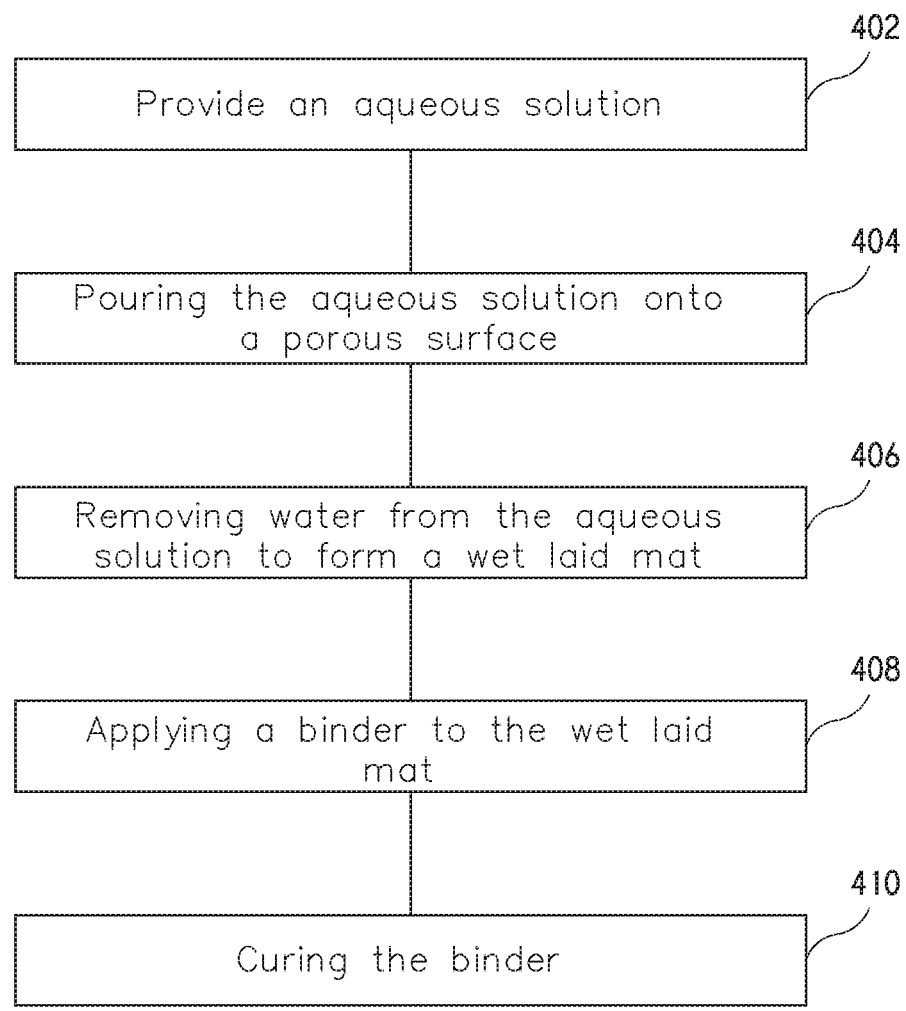
FIG. 4 illustrates a method of forming a construction product or board.

Referring now to FIG. 4, illustrated is a method 400 of forming a construction product or board. The construction board formed according to the method 400 of FIG. 4 has or exhibits improved insulative properties in comparison with conventional fiberglass based construction boards. At block 402, an aqueous solution is provided that includes fibers and an Aerogel material or particles homogenously or uniformly dispersed within the fibers. In a specific embodiments, the fibers are glass fibers and more commonly a combination of coarse glass fibers and glass microfibers that are homogenously dispersed within the coarse glass fibers. The coarse glass fibers may have average fiber diameters of between 8 and 20 μm and the glass microfibers may have average fiber diameters of between 0.5 and 6 μm. At block 404, the aqueous solution is poured onto a porous surface. At block 406, water is removed from the aqueous solution to form a wet laid mat, or wet fiber web, of the fibers and Aerogel material atop the porous surface. At block 408, a binder is applied to the wet laid mat and at block 410, the binder is cured to bond the fibers and Aerogel material together and thereby form a fiber core of the construction board. In some embodiments, the method 400 also includes applying pressure to the wet laid mat during the curing process.

In some embodiments, the method 400 of FIG. 4 may include an additional step that enables a more complex shape to be formed of the wet laid mat. Specifically, after the binder is added to the wet laid mat at block 408, the wet laid mat may be transferred to a mold that defines the complex shape. In a particular embodiment, the mold is a pipe or cylindrical shaped mold, although various other shaped molds could be used to produce an insulation product with a desired shape. The mold may contain a removable and lockable sheath, which keeps the wet laid materials compressed while the materials are cured and which allows the insulation product to be removed from the mold after curing. The wet laid materials may include between 20 and 40% water while in the mold. The wet laid material may be cured in the mold by subjecting the materials to an oven temperature of between 150 and 200 Celsius for between 2 to 4 hours, although other oven temperatures and times may be employed. In some embodiments, a water vapor impermeable film may be attached or adhered to the insulation product while the wet laid material is being cured. For example, the mold may include the water vapor impermeable film so that transferring the wet laid materials to the mold causes the materials to be in direct contact with the film. The curing process may bond or adhere the film to the materials. The water vapor impermeable film may comprise or consist of a plastic film, a coated paper, an aluminum film laminated facer, and the like. The complex shaped insulation product may have the compositions (i.e., coarse fiber, microfiber, carbon black, aerogel, etc.) and characteristics (i.e., ASTM E values, R-values, etc.) described herein.

In some embodiments, the fiber core includes between 1 and 15 weight percent of coarse glass fibers and between 10 and 40 weight percent of glass microfibers. In other embodiments, the fiber core may include any of the fiber compositions and/or fiber types that are contemplated by the disclosure herein. The fiber core may include between 30 and 90 weight percent of the Aerogel material, and more commonly between 40 and 80 weight percent of the Aerogel material. In a specific embodiment, the fiber core may include at least 50 weight percent of Aerogel particles and more commonly between 50 and 80 weight percent of the Aerogel particles. In some embodiments, the aqueous solution may also include a blackbody material, and in particular carbon black, that is homogenously or uniformly dispersed within the fibers and the Aerogel particles. In such embodiments, the fiber core may include between 40 and 90 weight percent of the Aerogel particles and carbon black. The Aerogel particle and carbon black may include between 85 and 95 weight percent Aerogel particles and between 5 and 15 weight percent carbon black, or any other combination of the Aerogel particles and carbon black contemplated by the disclosure herein.

The fiber core formed according to the method 400 of FIG. 4 has or exhibits an R-value of at least 6.5 per inch and in some embodiments exhibits an R-Value of at least 7.0 per inch. The fiber core also has or exhibits a flame spread index of no greater than 5 and a smoke development index of no greater than 20 as measured according to ASTM E-84 test.

Examples

A first construction board as described herein was formed by pouring or forming a polyacrylamide viscose aqueous solution (i.e., white water) with dispersing agent in a mixing tank (e.g., a pulper). A 10% slurry of the construction board ingredients was formed in the white water solution to achieve a targeted aerogel content, board density, and board thickness in the construction board. In forming the slurry, the order of the added individual ingredients is often important to achieve a uniform slurry. In the instant example, glass microfibers (i.e., 481 (110×) MICRO-STRAND® GLASS MICROFIBERS sold by Johns Manville Corp) were added and mixed in white water followed by a hydrophobic agent (e.g., 75SF EMULSION sold by DOW CORNING®) and a binder, such as Polon MF-56, which is manufactured by Shin-Etsu. Chemical Co., Ltd., and which is a self-cross-linking organopolysiloxane emulsion that does not require a catalyst. Binders, such as Polon MF-56 may form a high strength silicone rubber film as they dry that is able to repel water. In instances where coarse fibers are used, the coarse fiber will typically be added before the microfibers and mixed within the white water until they are well dispersed within the white water. The microfibers will then be added and mixed, which allows for better overall dispersion of the fibers within the white water.

The solution was under constant agitation until all ingredients were uniformly mixed. Aerogel particles were then added slowly to the white water solution without mixing. Once all the Aerogel particles were added, the agitation was restarted to homogenously or uniformly disperse the Aerogel particles within the white water solution. The carbon black dispersion was then added to the white water solution, which resulted in the slurry turning black. The uniformity, or homogenous dispersion of the carbon black and/or other ingredients may be visibly determined by visually determining if the slurry is uniformly black or grey. A variation in the color of the slurry typically indicates that the carbon black and/or other ingredients are not uniformly or homogenously dispersed within the slurry. A flocculant (e.g., 10% solution of Aluminum Sulfate) was also added to the white water solution to flocculate the dispersion or emulsion so that the components are no longer water soluble. The addition of the flocculant to the slurry causes the mixture of fibers, aerogel, binder and carbon black to form clumps or flocs, which may be separated from the water. Typically, the binder and carbon black will stick on surface of aerogel and fibers, which ensure that these materials are not lost due to drainage of the water.

The flocculated slurry was then transferred into a draining station to form a wet laid mat or fiber web. For continuous processes, the draining station is a forming belt or hydro-former and the slurry is laid on a moving forming belt that typically has a designed woven pattern for draining the water while preventing the added components or ingredients from passing or falling through the belt. The slurry is contained on the moving belt by a frame or wall on opposing sides of the moving belt. The water in the slurry was drained by multi sets of vacuum pipes under the belt. While moving, the slurry is concentrated and a wet laid mat with reduced water content is formed upon reaching a belt-press. After pressing the wet laid mat with the belt-press, the wet laid mat was cut into specific lengths with a water jet cutter. The cut wet laid mats may be continuously transferred into a thickness containing device and clamped. The clamped wet laid mat would then be transferred to an oven for drying.

A typical formulation or composition of a construction board formed according to the method immediately described above is shown in Table 1. The construction board of Table 1 did not include coarse fibers and instead included only microfibers. In other instances, coarse glass fibers were added to the construction board in addition to the microfibers. The construction board of Table 1 is composed mainly of Aerogel particles (i.e., 60%) with the microfibers constituting the other main component (i.e., 20%). The carbon black constituted about 5% of the construction board while the binder constituted roughly 15% of the construction board.

TABLE 1

Thermal Insulation Composite Board Formulation with 60% Aerogel

| Components | Weight % |
|---|---|
| Aerogel Particle (Aerogel P400) | 60 |
| Microfiber (Microfiber 481) | 20 |
| Binder (Polon MF-56) | 14 |
| Carbon Black (Ajack Black 2) | 5 |
| Hydrophobic Agent (DC SF 75) | 1 |

Additional construction board formulations or compositions formed according to the embodiments described above are shown in Tables 2 and 3 below.

TABLE 2

Thermal Insulation Composite Board Formulation with 50% Aerogel

| Components | Weight % |
|---|---|
| Aerogel Particle (Aerogel P400) | 50 |
| Microfiber (Microfiber 481) | 30 |
| Binder (Polon MF-56) | 14 |
| Carbon Black (Ajack Black 2) | 5 |
| Hydrophobic Agent (DC SF 75) | 1 |

The construction board of Table 2 has a slightly lower amount of Aerogel particles (i.e., 50%) than the construction board of Table 1 and a slightly greater amount of microfibers (i.e., 30%) than the construction board of Table 1. The amount of carbon black and binder employed in the construction board of Table 2 is roughly equivalent with that of Table 1—i.e., roughly 5% and 15% respectively.

TABLE 3

Thermal Insulation Composite Board Formulation with 65% Aerogel

| Components | Weight % |
|---|---|
| Aerogel Particle (Aerogel P400) | 65 |
| Microfiber (Microfiber 481) | 15 |
| Binder (Polon MF-56) | 14 |
| Carbon Black (Ajack Black 2) | 5 |
| Hydrophobic Agent (DC SF 75) | 1 |

The construction board of Table 3 has a slightly greater amount of Aerogel particles (i.e., 65%) than the construction board of Table 1 and a slightly lower amount of microfibers (i.e., 15%) than the construction board of Table 1. The amount of carbon black and binder employed in the construction board of Table 3 is roughly equivalent with that of Table 1—i.e., roughly 5% and 15% respectively.

In other embodiments, complex shapes, such as pipes may be formed. In particular, a pipe or cylindrical object was formed, which had the same composition of the insulation board described in relation to Table 1. The slurry making and flocculation process were the same as those described in forming the insulation board of Table 1. However, once the slurry was flocculated by an addition of 10% solution of Aluminum Sulfate, the mixture was dewatered/filtrated through a hydraulic filter press to generate an aggregate of the materials. In the pipe forming process, the aggregate included between 20 and 40% water. These aggregate of materials was then transferred into a mold, which in the instant case was a pipe or cylindrical shaped mold, but could by another shape as desired for different applications. The mold contained a removable and lockable sheath, which was configured to keep the materials compressed while the materials were dried in an oven. The drying process involved subject the mold and materials to an oven between 150 and 200 Celsius for approximately 2 to 4 hours. In the molding process, a water vapor impermeable film was attached to the insulation core, although this step is an optional step in forming the insulation product. The water vapor impermeable film may comprise or consist of a plastic film, a coated paper, an aluminum film laminated facer, and the like. The water vapor impermeable insulation may be particular useful for low or extreme low temperature applications.

Several construction boards having a formulation or composition as provided in Tables 1-3 were tested according to ASTM C-518-17 to measure the thermal insulation value (R-value) of the various boards. The measured R-values of the tested boards is provided in Table 4 below. The density of the boards were varied to determine the effect of density on the R-value. Table 4 demonstrates that essentially each construction board exhibited an R-value of at least 6.5/inch with sample 1 being the only exception. The inventors believe that the R-value of sample 1 was an outlier and that additional testing of the similarly composed boards would result in an R-value of at least 6.5/inch. Table 4 further demonstrates that half of the construction boards exhibited an R-value of at least 7.0/inch. In particular the construction boards with a Aerogel content of 65% each achieved an R-value of at least 7.0/inch. As provided in Table 4, the thermal insulation value (R-value) of the board is dependent on the Aerogel/carbon black content and the density of the board with a higher Aerogel content exhibiting an increase in thermal insulation R-values.

TABLE 4

Thermal Insulation Performance of Aerogel Containing Composite Board

| Sample # | Aerogel Content (%) | Board Density (pcf) | R/inch |
|---|---|---|---|
| 1 | 50 | 6 | 6.39 |
| 2 | 50 | 8 | 6.55 |
| 3 | 50 | 10 | 6.67 |
| 4 | 60 | 6 | 6.69 |
| 5 | 65 | 5 | 7.17 |
| 6 | 65 | 6 | 7.53 |
| 7 | 65 | 7 | 7.54 |
| 8 | 65 | 8 | 7.63 |

The fire performance of samples 1-6 of Table 4 were also evaluated according to the ASTM E-1354-17 Cone calorimeter Test. The results of the test are provided in Table 5 below. The construction boards exhibited good performance in terms of Peak Heat release rate ($HRR_{peak}$), Total Mass Loss (MLR), and Total Smoke Rate ($S_A$), with the lower density construction boards typically exhibiting a lower heat release rate and a lower smoke rate.

TABLE 5

Cone Calorimeter Test of Aerogel Containing Composite Board

| Sample # | Aerogel (wt %) | Density (pcf) | $HRR_{peak}$ (kW/m$^2$) | THR (MJ/m$^2$) | MLR (g/m$^2$-s) | EHC (MJ/m$^2$) | $S_A$ (m$^2$/m$^2$) |
|---|---|---|---|---|---|---|---|
| 1 | 50 | 6 | 50 | 7.7 | 0.8 | 32.6 | 3 |
| 2 | 50 | 8 | 49 | 11.4 | 0.6 | 46.1 | 2 |
| 3 | 50 | 10 | 53 | 13.7 | 0.6 | 46.9 | 4 |
| 4 | 65 | 6 | 47 | 6.9 | 0.8 | 36.6 | 2 |
| 5 | 65 | 7 | 54 | 12.0 | 0.7 | 35.4 | 2 |
| 6 | 65 | 8 | 51 | 12.9 | 0.6 | 39.2 | 7 |

The construction boards of samples 1-6 were tested at a heat flux of 50 kW/m$^2$. Each of the construction boards achieved a flame spread index of approximately 0 and a smoke development index of approximately 15 in accordance with the ASTM E-84-17 test.

Figure 5:
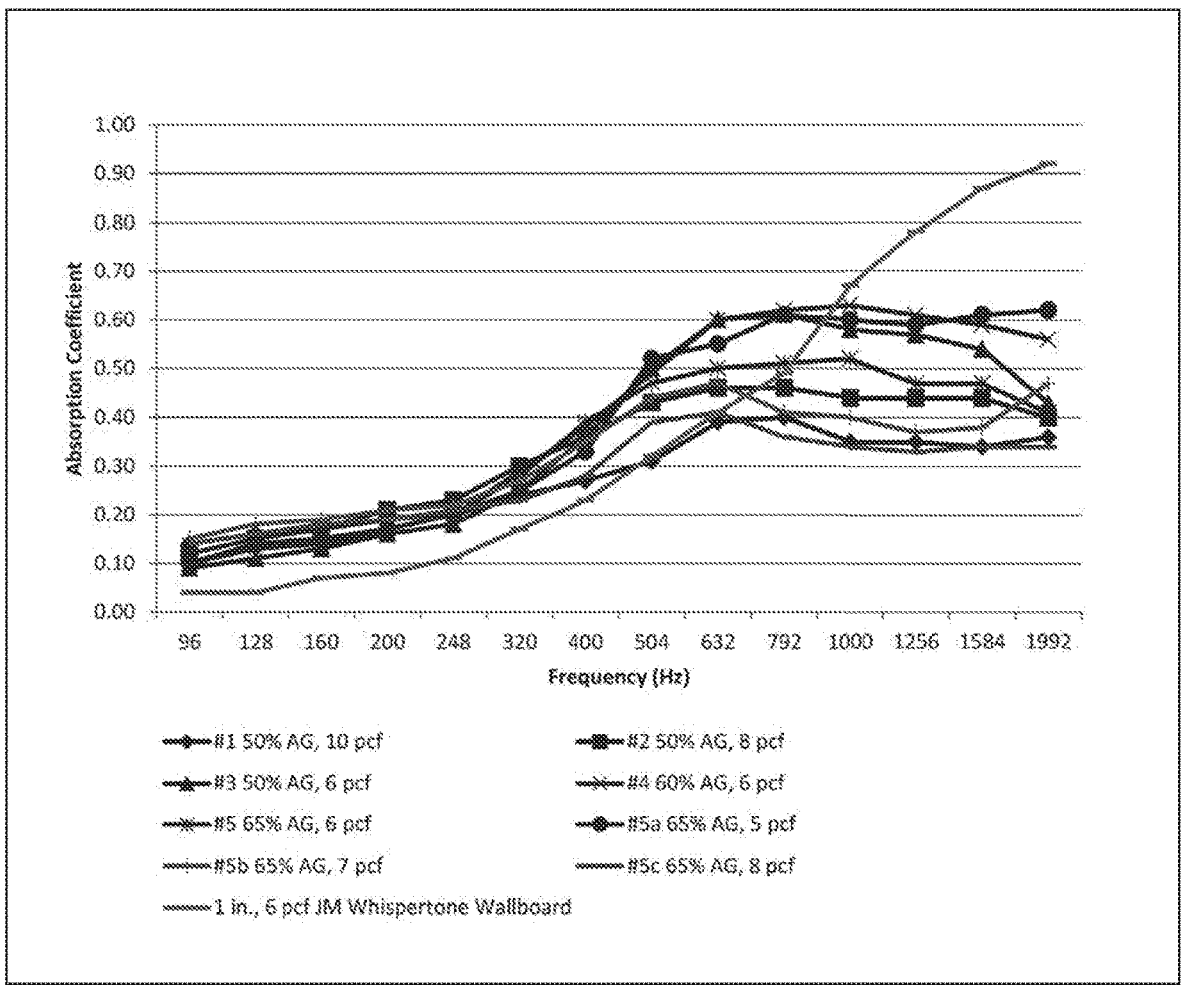
FIG. 5 illustrates the results of a sound adsorption test conducted on Aerogel containing construction boards in accordance with ASTM E-1050.

The sound adsorption of the construction boards was also tested according to ASTM E-1050-17. The performance was compared to a 1 inch 6 pound per cubic foot (pcf) fiberglass board, which was used as a control (i.e., the Whispertone® Wallboard sold by Johns Manville). The results of the test are illustrated in FIG. 5. For the control, the absorption coefficient approaches 1.00 as the frequencies increases to around 2 kHz. In comparison, the absorption coefficient of the Aerogel construction boards level out between 0.30 and 0.60 around 600 Hz, which may be caused by the lower porosity (i.e., the increase percentage of open areas in the board) in comparison to the fiberglass control board. The data suggests that the lower density Aerogel construction boards tend to have better sound dampening performance at higher frequencies, which is likely due to the more porous and lower density boards increasing the sound absorption.

Figure 6:
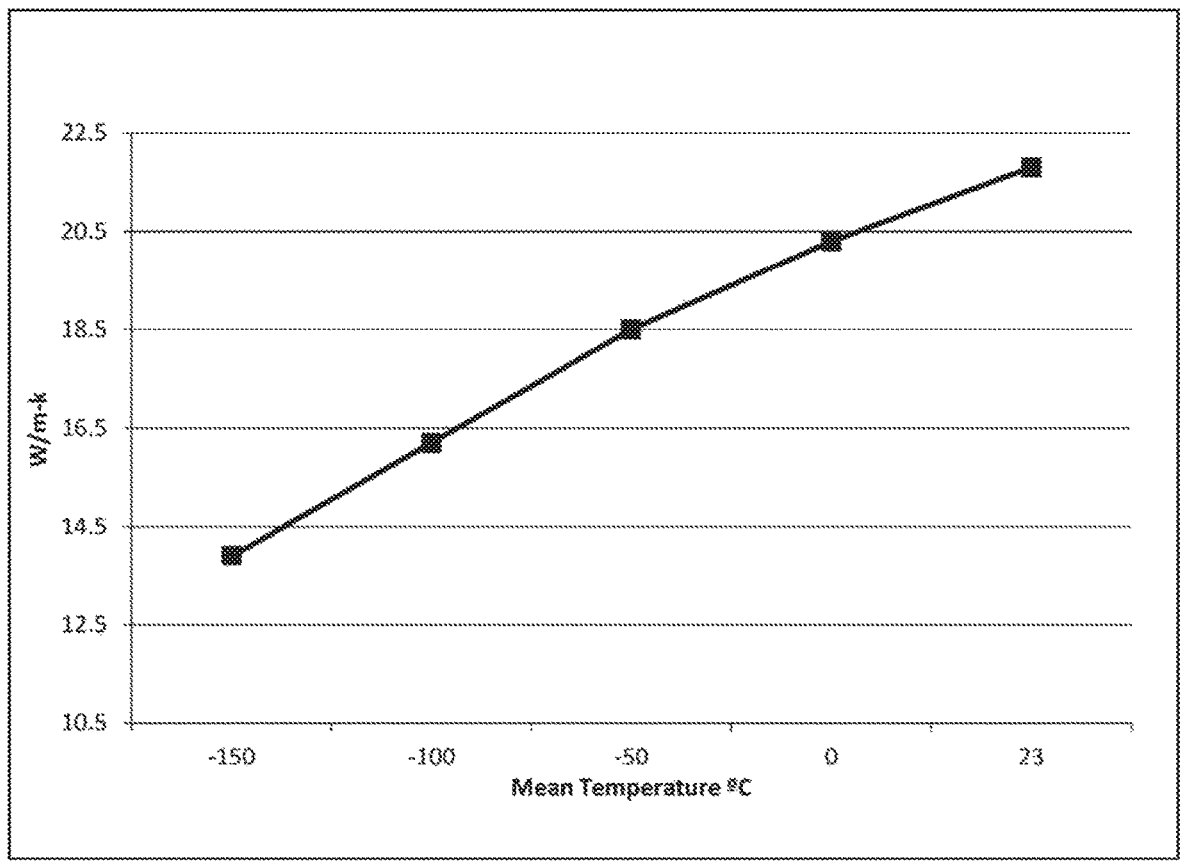
FIG. 6 illustrates the results of a cryogenic thermal conductivity test conducted on an Aerogel containing construction board.

The cryogenic thermal conductivity of an Aerogel containing construction board was also tested and results are illustrated in FIG. 6. As illustrated in FIG. 6, the construction board exhibited good/low thermal conductivity at cryogenic conditions. Thus, in addition to good insulative properties at high temperatures, the construction boards described herein also exhibit good insulative properties at low temperature.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A glass fiber based construction product comprising:
    a glass fiber core comprising:
        a plurality of entangled coarse glass fibers having average fiber diameters of between 8 and 20 µm;
        a plurality of entangled glass microfibers homogenously dispersed within the entangled coarse glass fibers, the glass microfibers having average fiber diameters of between 0.5 and 6 µm; and
    a binder that bonds the plurality of coarse glass fibers and the plurality of glass microfibers together; and
    a mixture of Aerogel and carbon black disposed within the glass fiber core;
    wherein the construction product has an R-value of at least 6.5 per inch and the construction product has a flame spread index no greater than 5 and a smoke development index no greater than 20 as measured according to ASTM E84; and
    wherein the binder is a crosslinking siloxane based emulsion.

2. The glass fiber based construction product of claim 1, wherein the glass fiber core includes between 1 and 15 weight percent of the coarse glass fibers and between 10 and 40 weight percent of the glass microfibers.

3. The glass fiber based construction product of claim 1, wherein the glass fiber core includes at least 50 weight percent of the Aerogel.

4. The glass fiber based construction product of claim 1, wherein the mixture of Aerogel and carbon black includes between 85 and 95 weight percent of the Aerogel and between 5 and 15 weight percent of the carbon black.

5. The glass fiber based construction product of claim 4, wherein the glass fiber core includes between 30 and 80 weight percent of the mixture of Aerogel and carbon black.

6. The glass fiber based construction product of claim 1, wherein the construction product has an R-value of at least 7.0 per inch.

7. The glass fiber based construction product of claim 1, wherein the glass fiber core includes between 5 and 20 weight percentage of the binder.

8. The glass fiber based construction product of claim 1, wherein the construction product is employed in:
    a residential structure;
    a commercial structure;
    an oil or gas refinery;
    a chemical plant;
    an automotive structure; or
    an aerospace structure.

9. A construction product comprising:
    a fiber core comprising a plurality of entangled glass fibers;
    a binder that bonds the plurality of entangled glass fibers together; and
    an Aerogel material disposed within the fiber core;
    wherein:
        the fiber core includes between 30 and 90 weight percent of the Aerogel;
        the construction product has an R-value of at least 6.0 per inch; and
        the binder is a crosslinking siloxane based emulsion.

10. The construction product of claim 9, further comprising carbon black disposed within the fiber core.

11. The construction product of claim 10, wherein the glass fiber core includes between 30 and 90 weight percent of a mixture of the Aerogel and carbon black.

12. The construction product of claim 9, wherein the plurality of entangled glass fibers comprises:
    a plurality of entangled coarse glass fibers having average fiber diameters of between 8 and 20 µm; and
    a plurality of entangled glass microfibers homogenously dispersed within the entangled coarse glass fibers, the glass microfibers having average fiber diameters of between 0.5 and 6 µm.

13. The construction product of claim 12, wherein the fiber core includes between 1 and 15 weight percent of the coarse glass fibers and between 10 and 40 weight percent of the glass microfibers.

14. The construction product of claim 9, wherein the fiber core includes at least 50 weight percent of the Aerogel.

15. The construction product of claim 9, wherein the construction product has an R-value of at least 6.5 per inch.

16. The construction product of claim 9, wherein the construction product has a flame spread index no greater than 5 and a smoke development index no greater than 20 as measured according to ASTM E-84 tunnel test.

17. A method of forming a construction product comprising:
- providing an aqueous solution that includes glass fibers and an Aerogel material dispersed within the glass fibers;
- pouring the aqueous solution onto a porous surface;
- removing water from the aqueous solution to form a wet laid mat or material mixture of the glass fibers and Aerogel material atop the porous surface;
- applying a binder to the wet laid mat or material mixture; and
- curing the binder to bond the glass fibers and Aerogel material together and thereby form a fiber core of the construction product;
- wherein the binder is a crosslinking siloxane based emulsion.

18. The method of claim 17, wherein:
- the fiber core includes between 30 and 90 weight percent of the Aerogel;
- the fiber core has an R-value of at least 6.5 per inch; and
- the fiber core has a flame spread index of no greater than 5 and a smoke development index of no greater than 20 as measured according to ASTM E-84 test.

19. The method of claim 17, wherein the aqueous solution also includes carbon black that is homogenously or uniformly dispersed within the glass fibers and the Aerogel material.

20. The method of claim 19, wherein the fiber core includes between 40 and 90 weight percent of the Aerogel material and carbon black.

* * * * *